United States Patent
Bezzola et al.

[11] Patent Number: 5,866,865
[45] Date of Patent: Feb. 2, 1999

[54] WIRE DIRECTION CHANGER ASSEMBLY FOR A WIRE ELECTRODE SPARK EROSION MACHINE

[75] Inventors: Luciano Bezzola, Muzzano; Karl Tobler, Maggia, both of Switzerland

[73] Assignee: Agie SA., Lonsone, Switzerland

[21] Appl. No.: 812,398

[22] Filed: Mar. 5, 1997

[30] Foreign Application Priority Data

Nov. 12, 1996 [DE] Germany .................. 196 46 677.6

[51] Int. Cl.⁶ ..................................................... B23H 7/10
[52] U.S. Cl. ........................................................ 219/69.12
[58] Field of Search .................. 219/69, 12; 204/224 M

[56] References Cited

U.S. PATENT DOCUMENTS

| | | | |
|---|---|---|---|
| 4,663,509 | 5/1987 | Kawashima | 219/69.12 |
| 5,073,691 | 12/1991 | Magara et al. | 219/69.12 |
| 5,449,873 | 9/1995 | Onandia | 219/69.12 |
| 5,495,086 | 2/1996 | Onandia | 219/69.12 |

FOREIGN PATENT DOCUMENTS

| | | | |
|---|---|---|---|
| 39 43 652 | 12/1989 | Germany . | |
| 40 19 970 | 6/1990 | Germany . | |
| 195 02 151 | 1/1995 | Germany . | |
| 59-14428 | 1/1984 | Japan . | |
| 62-188627 | 8/1987 | Japan . | |
| 4-105822 | 4/1992 | Japan . | |
| 5-92322 | 4/1993 | Japan . | |
| 5-301120 | 11/1993 | Japan | 219/69.12 |
| 6-126537 | 5/1994 | Japan | 219/69.12 |

OTHER PUBLICATIONS

Patent Abstracts of Japan, M–1286, vol. 16, No. 346, no publication date.
Patent Abstracts of Japan, M–295, vol. 8, No. 100, no publication date.
Patent Abstracts of Japan, M–1459, vol. 17, No. 427, no publication date.
Patent Abstracts of Japan, M–664, vol. 12, No. 36, no publication date.

*Primary Examiner*—Geoffrey S. Evans
*Attorney, Agent, or Firm*—Darby & Darby

[57] ABSTRACT

A wire direction changer assembly is disclosed for installation in the wire path system of a wire electrode spark erosion machine with a wire entrance port, a wire discharge port, an essentially tube or tunnel wire guide channel connecting to both ports along a curved path; and a suction nozzle disposed in the region of the wire discharge port for providing a fluid flow through the wire guide channel. These features provide an exceptionally trouble-free fluid-supported wire direction changer of the electrode wire, while at the same time ensuring trouble-free automatic wire threading.

9 Claims, 4 Drawing Sheets

WIRE DIRECTION CHANGER ASSEMBLY FOR A WIRE ELECTRODE SPARK EROSION MACHINE

BACKGROUND OF THE INVENTION

1. Field of the Invention

The present invention relates to a wire direction changer assembly of the type described in the preamble of claim 1, i.e. to a wire direction changer assembly for installation in the wire path system of a wire electrode spark erosion machine, the assembly comprising: a wire entrance port; a wire discharge port; a substantially tube-like or tunnel-like wire guide channel connecting both ports along a curved path; and a device for providing fluid flow through the wire guide channel.

Wire direction changer assemblies of this type are known and have proven to be very useful. This holds true especially when the wire electrode breaks during unsupervised erosion operation and has to be automatically rethreaded through the workpiece.

2. Description of the Related Art

The probably first application for a patent in the field of wire return supported by fluid flow was filed in 1982, resulting in the grant of Japanese Patent 1 416 582 (MAKINO). A general description of the wire direction changer assembly can be found therein. In MAKINO, the wire direction changer assembly is basically constructed as a guide block having the shape of a housing with a wire guide channel curved at a right angle extending therethrough and supporting a guide roller for rotation therein. The wire guide channel initially extends from its wire entrance port vertically downward, subsequently transitions into a channel section curved at a right angle, which in turn runs into a straight horizontal channel section. The latter discharges into a wire discharge port, from where the wire is transported into a guide tube and subsequently conveyed to a pair of pulleys. In the guide block, there is a return pulley supported for rotation in such a way that in the section of the 90° turn its periphery forms the (moving, curved) interior wall of the wire guide channel. In this region, there are two injection channels formed for injecting a pressurized liquid into the horizontal section of the wire guide channel. The injected pressurized liquid urges the wire electrode onto the periphery of the return pulley which is formed as a V-groove, and pushes or presses, as the case may be, and finally guides the wire electrode to the wire discharge port. The stream of pressurized liquid, working in a similar manner as a water jet pump, takes up any fluid remaining in the vertical section of the wire guide channel, which may consist of air or the process fluid used during spark erosion, also called dielectric.

The aforedescribed typical wire direction changer assembly was later modified as, for example, described in the Japanese Patent 1 974 770 (MITSUBISHI DENKI) and the corresponding Patents DE 39 91 621 T1 or U.S. Pat. No. 5,073,691. In contrast to the prior state of the art, the latter wire direction changer assembly moves the location for injecting the pressurized liquid to the region of the wire entrance port, thereby pushing or pressing the electrode wire through the wire guide channel from the beginning to the end.

An improvement of the wire direction changer assembly described last can be found in the Japanese patent 1 951 281 (MITSUBISHI DENKI). Here, injection of the pressurized liquid still remains in the region of the wire entrance port, although in this case aided by a suction nozzle which sucks the wire electrode from the outside into the wire entrance port, but the wire electrode is once more pushed or pressed through the entire wire guide channel.

A corresponding embodiment can also be found in the Japanese patent 2 5525 234 (MITSUBISHI DENKI) and the corresponding patents DE 39 42 957 A1 or U.S. Pat. No. 5,126,524. A wire direction changer assembly of this design has also bee older German patent application of the Applicant (AGIE) with the reference number 196 07 705.2.

Under unfavorable conditions, in particular with today's very thin wire electrodes frequently in use having, for example, a diameter of 0.1 to 0.3 mm or less, malfunctions may occur in the region of the curved wire guide channel in spite of the significant advantages provided by the aforedescribed fluid-supported wire return. Frequently, the electrode wire which is pushed or pressed by the pressurized liquid, bumps in this region against the outside wall, thereby roughening the wall over time and impairing the flow conditions.

A wire return not supported by fluid is known from JP-A-6 126 537 (FANUC). There the wire direction changer assembly neither includes a substantially tube-like or tunnel-like wire guide channel nor a device for generating a fluid flow; in particular, no device for generating a fluid flow through a non-existing wire guide channel.

SUMMARY OF THE INVENTION

It is the object of the invention to provide a fluid-supported wire direction changer assembly for enabling an even more trouble-free fluid-supported wire direction changer while at the same time retaining as many of the prior advantages as possible.

The object of the invention is attained with a wire direction changer assembly for installation in the wire path system of a wire electrode spark erosion machine, with a wire entrance port;

a wire discharge port;

a substantially tube-like or tunnel-like wire guide channel connecting both ports along a curved path; and a device for providing fluid flow through the wire guide channel, the device disposed in the region of the wire discharge port and formed as a suction device.

In contrast to known arrangements, the electrode wire is here, in a way, pulled or sucked through the wire guide channel, rather than pushed or pressed. This design seems to lead to substantially improved flow conditions in the region directly near the wire return. Experiments performed by the applicant have demonstrated that the design of the suction device according to the invention significantly improves the reliability and consequently the operational dependability of a fluid-supported wire return.

The suction device is preferably formed as a suction nozzle. In this way, known simple suction means can be employed for simultaneously providing trouble-free wire delivery and centering the wire in the wire discharge port.

It has proven to be particularly advantageous to construct the suction nozzle in the form of a dual-chamber nozzle having basically two mutually concentric nozzle chambers, with the inner nozzle chamber running into the wire discharge port and the outer nozzle chamber adapted for connection to a pressurized fluid supply. Nozzles of this type are known, making it feasible to employ proven existing nozzle designs. In this case, the inner nozzle chamber—viewed in the wire feed direction—projects outwardly from the outer nozzle chamber, so that the electrode wire comes in contact with the pressurized liquid only outside the wire direction changer assembly.

In principle, the wire guide channel of the wire direction changer assembly of the invention may only consist of a curved tube, the entrance of which is formed by the wire entrance port and the exit of which is formed by the wire exit port. Preferably, however, the wire return is supported by a rotatably supported return pulley, with the return pulley forming a section of the wall of the curved portion of the wire guide channel. The wire direction changer assembly herein preferably comprises a guide block with the wire guide channel extending therethrough; in addition, a return pulley rotatably supported in the guide block, with the periphery of the return pulley forming a curved wall section of the wire guide channel and moving in concert with the return pulley. A guide block, particularly a guide block formed as a right parallelepiped, can be easily connected to other elements of the wire transport system of a spark erosion machine by, for example, bolting or flange-mounting; the wire guide block can be connected, for example, to the wire discharge port end of the lower wire guide head or to the wire entrance port end of the upper wire guide head or to other tube sections guiding the wire in the wire transport system.

Secure guiding of the wire during the return is achieved by providing a V-shaped or a U-shaped guide groove at the periphery of the return pulley.

The assumption so far has been that the pressurized liquid supplied to the wire guide channel has to entrain the return pulley rather well in order to provide a reliable wire return. This may suggest to dispose on the periphery of the return pulley paddles, blades, or other elements driven by the flow. Experiments performed by the applicant, however, has shown exactly the opposite. The smoother the surface of the periphery of the return pulley is, the more secure and trouble-free is the wire return, in particular for automatic wire threading operation.

This situation is taken into account in that the periphery of the return pulley is entirely smooth.

Additional preferred embodiments are the subject matter of the dependent claims which have thus far not been discussed in detail.

Other objects and features of the present invention will become apparent from the following detailed description considered in conjunction with the accompanying drawings. It is to be understood, however, that the drawings are intended solely for purposes of illustration and not as a definition of the limits of the invention, for which reference should be made to the appended claims.

BRIEF DESCRIPTION OF THE DRAWINGS

In the drawings, wherein like reference numerals delineate similar elements throughout the several views:

FIG. 3b is the vertical cross-section corresponding to FIG. 3a;

FIG. 4 is a perspective view of the suction nozzle depicted in the FIGS. 2 and 3a; and FIG. 5 is an enlarged view of the cross-section through the suction nozzle shown in FIG. 3a.

DETAILED DESCRIPTION OF THE PRESENTLY PREFERRED EMBODIMENTS

In the following description of the figures, identical reference numbers are used for identical components or for components having the same functionality.

Figure 1:
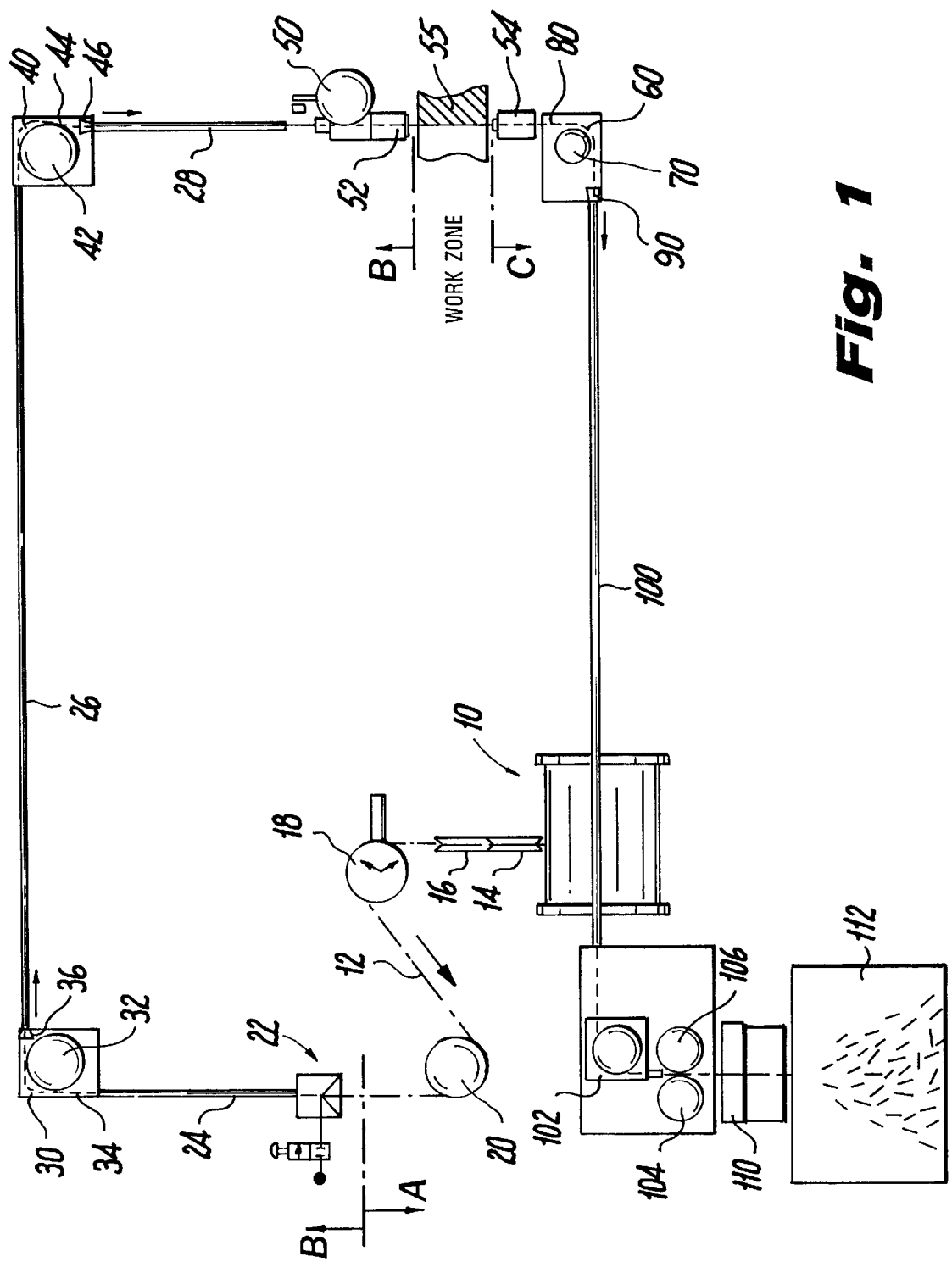
FIG. 1 is a schematic representation of a wire direction changer assembly of a wire electrode spark erosion machine.

FIG. 1 presents an overview over a wire direction changer assembly of a wire electrode spark erosion machine adapted for installation of the wire direction changer assembly of the invention. The wire direction changer assembly itself is already discussed in the aforementioned older German patent application 196 07 705.2 (AGIE). In order to avoid repetition, reference is made to the full description therein.

For the following description, it seems helpful to distinguish three regions surrounding the actual work zone (at the workpiece 55). Positioned before the work zone is an unwind region A and a feed region B. Following the work zone is a waste removal region C. The wire direction changer assembly of the invention can be successfully employed in all three regions A, B, C.

The unwind region A starts at the supply spool 10 and ends before an injector nozzle 22. Located in this region, initially on the supply spool 10, is the electrode wire 12 to be transported through the entire wire path system. The electrode wire 12 is conveyed to the injector nozzle 22 via four stabilizing return pulleys 14, 16, 18, and 20. Through those pulleys, the electrode wire 12 is redirected several times, each time associated with a change in the feed direction by 90 degrees or more.

The feed region B starts at the injector nozzle 22 and ends at an upper wire guide head 52 just before the work zone or the workpiece 55, respectively. Aside from the aforementioned components, it comprises three tubing sections 24, 26, and 28, two wire direction changer assemblies 30 and 40 as well as a brake pulley 50.

Operation of the injector nozzle 22 is initiated when the electrode wire 12 has to be threaded, generating a fluid jet for guiding, or at least aiding in the guiding of, the electrode wire on its way through the tubing sections 24, 26, and 28. Changes in the direction of motion of the electrode wire 12 occur in the wire direction changer assemblies 30 and 40, respectively, each comprising a return pulley 32, 42, a wire guide channel 34, 44 and a suction nozzle 36, 46 located at the discharge port of each wire guide channel 34, 44.

The brake pulley 50 is known to be important for creating a well defined wire tension.

In the feed region B, the electrode wire 12 runs in the following manner: initially, it passes through the injector nozzle 22 and the tubing section 24 thereafter. It is then turned in the return assembly 30 by about 90° and subsequently runs along the tubing section 26. After another turn by about 90° in the return assembly 40, it reaches via the tubing section 28 the brake pulley 50, looping around the brake pulley 50 once. The electrode wire 12 next reaches the actual work zone via the upper wire guide head 52.

The discharge region C is also shown in FIG. 1. It is located immediately after the work zone near the workpiece 55 and starts with a lower wire guide head 54. The discharge region C ends with a waste container 112 and further comprises a wire direction changer assembly 60 including return pulley 70, wire guide channel 80 and suction nozzle 90; in addition, following the suction nozzle 90, a tubing section 100, a return pulley 102, a pair of tensioning pulleys 104, 106 and a wire shredder 110.

The electrode wire 12, in conjunction with a threading jet, is threaded through a starting hole (not shown) in the workpiece 55, next reaches the lower wire guide head 54 and from there the wire guide channel 80 of the return assembly 60. The suction nozzle 90 located at the discharge end of the wire guide channel 80 creates a fluid flow through the wire guide channel 80, thereby entraining the electrode wire 12. This fluid jet also transports the electrode wire 12 through the tubing section 100 to the return pulley 102 and from there to the pair of tensioning pulleys 104, 106.

Figure 2:
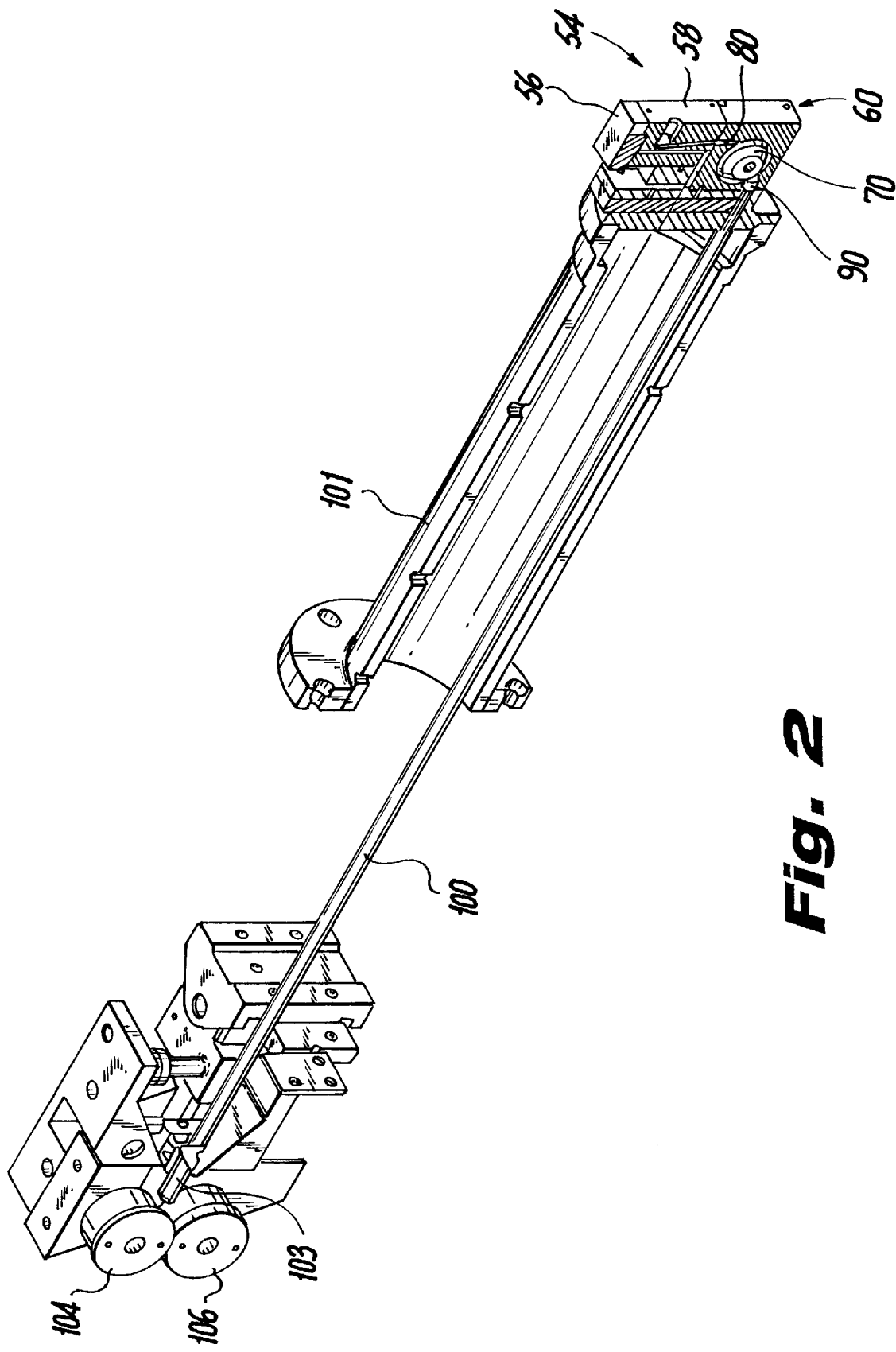
FIG. 2 is a perspective view of a section from the waste collection region C depicted in FIG. 1.

The last return pulley 102 is not required, if the pair of tensioning pulleys 104, 106 is arranged vertically and at the same height as the tubing section 100, as shown in the embodiment of FIG. 2.

In accordance with the invention, the wire could, if necessary, also be redirected or turned before the pair of tensioning pulleys 104, 106.

The pair of tensioning pulleys 104, 106 is driven by a drive motor (not shown) which creates, in conjunction with the brake pulley 50, the wire tension required for machining the workpiece 55. Simultaneously, the drive motor conveys the electrode wire 12 to the wire shredder 110. The pieces of wire ejected from the wire shredder 110 are collected in the waste container 112.

FIG. 2 depicts another embodiment of a section of the discharge region C. This section starts (viewed in the direction of wire feed) at the lower wire guide head 54 and ends at a pair of tensioning pulleys 104, 106 arranged vertically.

In this embodiment, the lower wire guide head 54 essentially comprises a wire guide element 56 facing the workpiece 55 and housing the actual wire guide mechanism, followed by (viewed in the direction of wire feed) a current feed 58 located underneath. Guide heads of this type are known and will not be discussed here in further detail.

Immediately after the wire discharge end of the lower wire guide head 54, there is located the wire entrance end of the return assembly 60 designed in such a way that the through channel for the wire in the lower wire guide head 54 extends to the wire guide channel 80 of the return assembly 60.

Here, too, the suction nozzle 90 pulls the electrode wire 12 out of the return assembly 60, transporting it directly between the pair of tensioning pulleys 104, 106 via the tubing section 100 and a tubing mouth piece attached thereto. In the embodiment of FIG. 2, the tubing section 100 is shielded from the exterior space by a jacket tube 101.

Figure 3A:
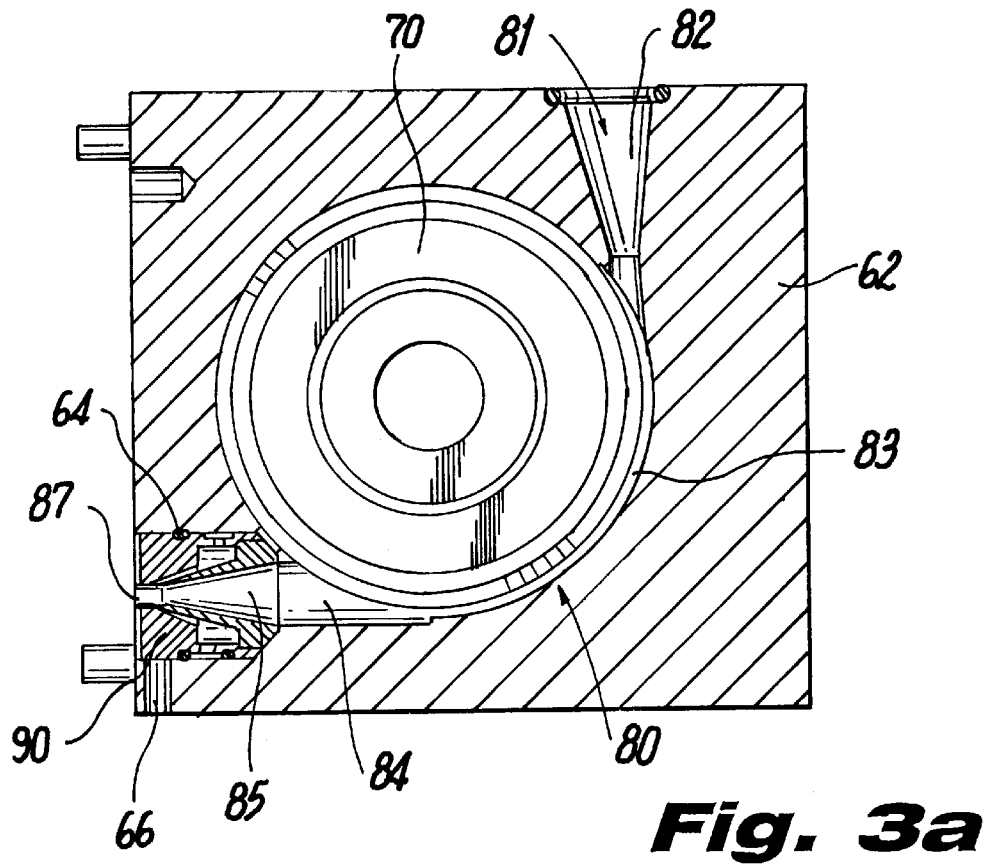
FIG. 3a is an enlarged vertical longitudinal section through the wire direction changer assembly shown in FIG. 2.
Figure 3B:
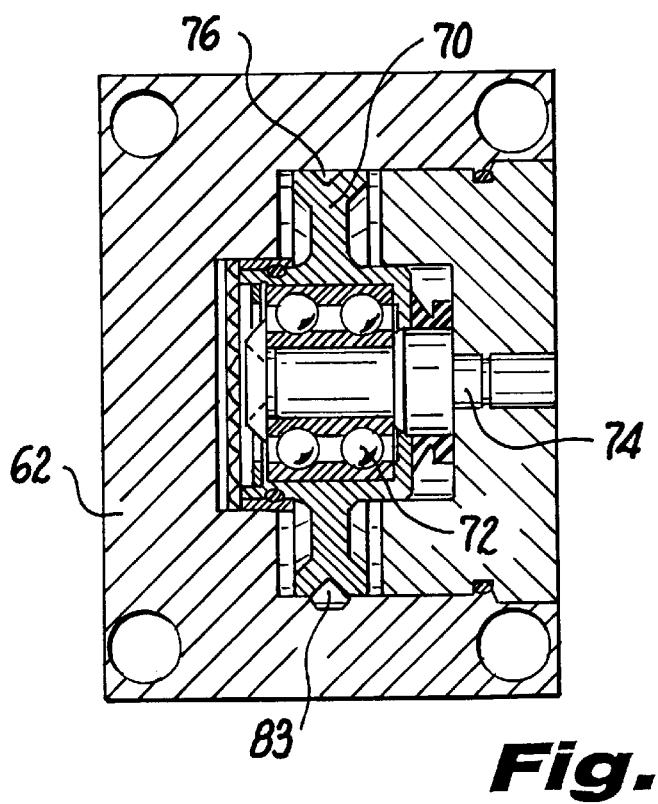
Figure 3C:
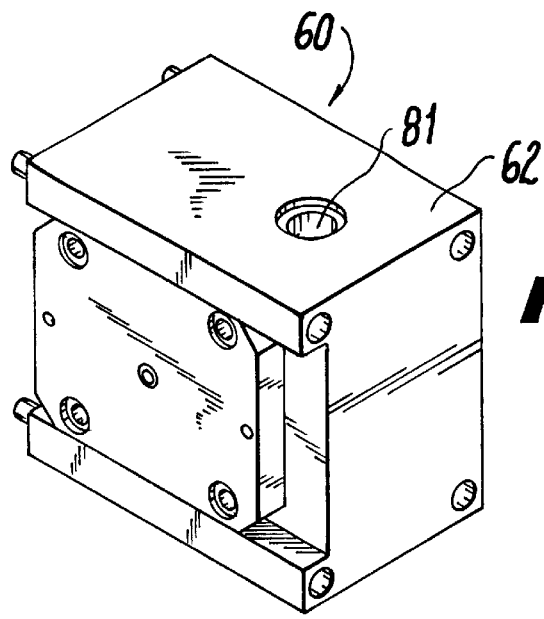
FIG. 3c is a perspective exterior view of the wire direction changer assembly shown in the FIGS. 3a and 3b.

FIG. 3 illustrates three enlarged views of the wire direction changer assembly 60 depicted in FIG. 2, namely as a vertical longitudinal section (FIG. 3a), as a vertical cross-section (FIG. 3b) and as a somewhat demagnified perspective view (FIG. 3c).

According to FIG. 3c, the wire direction changer assembly 60 is constructed as a guide block 62 in form of a housing with the wire guide channel 80 extending therethrough. The wire guide channel 80 connects the wire entrance port 81 with the wire discharge port 87 and essentially comprises the following three channel sections arranged in the following order when viewed in the direction of wire feed: a first substantially straight channel section shaped as an inlet funnel 82; a second channel section 83 curved about an angle of approximately 90°, and a third substantially straight channel section 84 whose end at the discharge side is shaped as discharge funnel 85. The latter extends into the wire discharge port 87.

The return pulley 70 is rotatably supported in the guide block 62 on an axis 74 by roller bearings 72. The periphery of axis 74 is formed as a entirely smooth V-shaped groove 76 for the purpose of guiding the electrode wire 12 precisely, but most importantly, vibration-free.

In the guide block 62, the return pulley 70 and the wire guide channel 80 are arranged with respect to each other in such a way that, at any given time, one peripheral section of the rotating return pulley 70 always forms the radially inward wall segment of the curved channel section 83. Some play is allowed or even required between the guide block 62 and the return pulley 70 to accommodate dimensional tolerances.

On the guide block 62, in the region of the wire discharge port 87, there is located a substantially cylindrical recess 64 with the suction nozzle 90 which is also cylindrical, disposed therein.

Figure 4:
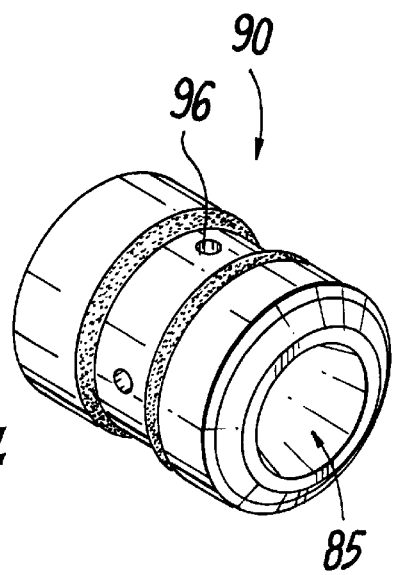
Figure 5:
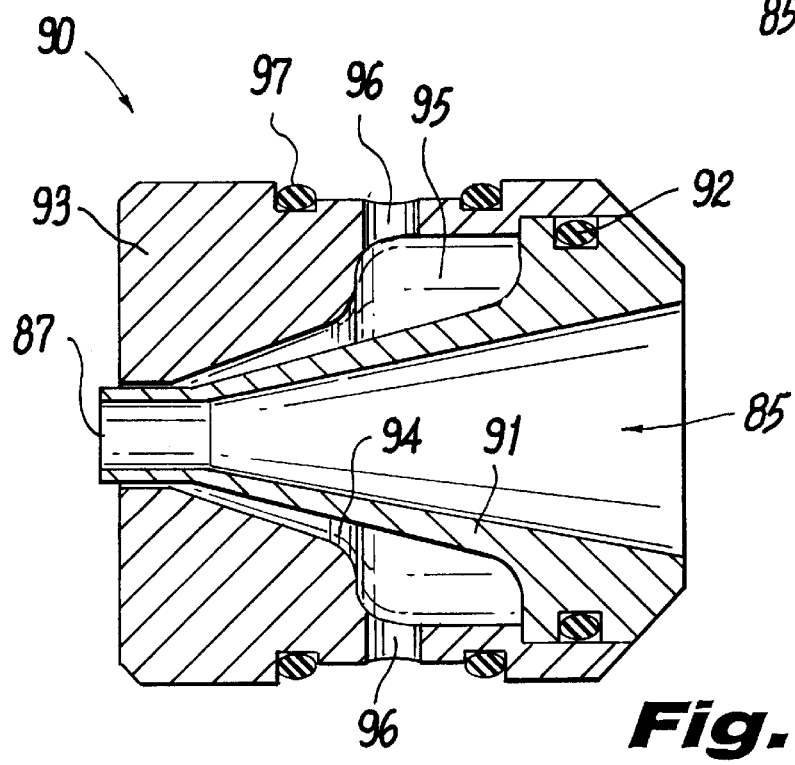

The suction nozzle 90 is depicted in greater detail in FIG. 4 (perspective view) and in FIG. 5 (in an enlarged longitudinal section). It has the form of a dual-chamber nozzle with two substantially mutually concentric nozzle chambers 85 and 95. The discharge funnel 85 of the wire guide channel 80 extending into the wire discharge port 87 forms the inner nozzle chamber, wherein the outside wall 91 of that nozzle is also tapered funnel-like towards the wire discharge port 87. The funnel so formed is inserted into a hollow cylinder 93 having also a funnel-shaped through hole 94 and sealed therewith with sealing rings 92. The outside wall of discharge funnel 85, in conjunction with the inner wall of the funnel-shaped through hole 94, forms the boundary of the outer nozzle chamber 95. The latter is connected to a pressurized fluid inlet channel 66 of the guide block 62 via a pressurized fluid inlet bore 96, thereby enabling connection to a pressurized fluid supply.

The inner nozzle chamber 85 protrudes somewhat from the outer nozzle chamber 95 as viewed in the direction of wire feed. Consequently, the electrode wire 12 comes into contact with the pressurized fluid supply only outside the return assembly 60.

Sealing rings 97 provide a leak-free support for the suction nozzle 90 in the recess 64 of the guide block 62.

The wire direction changer assembly 60 operates as follows: the suction nozzle 90 provides a low pressure in the region of the wire discharge port 87. Hereby, fluid is sucked in through the wire entrance port 81, flows through the wire guide channel 80, carrying with it the electrode wire 12. As a result, the electrode wire 12 is sucked or pulled, rather than pushed or pressed through the wire guide channel 80—as is the case with conventional devices. This, of course, provides advantages since the fluid and the wire are not pushed into the gap between the return block 62 and the return pulley 70, but always sucked out (low pressure). The aspirated fluid may be air; but may also be process liquid, which is the liquid dielectric, such as water with a low specified conductivity, generally used for spark erosion cutting.

The fluid may, for example, be provided by a so-called threading jet. If the workpiece is machined in the process liquid, for example inside a so-called dielectric tank, then the suction nozzle 90 sucks the process liquid through the lower wire guide head 54 and the wire guide channel 80.

The embodiment of a wire direction changer assembly described with reference to FIGS. 2 to 5 may also be implemented in the wire direction changer assemblies 30 and 40 shown in FIG. 1, with the difference that no coupling to a wire guide head is provided in that case; equally, if the wire is redirected in the region of return pulley 102 or redirected in any other way—even if the turn is larger or smaller than 90°, for example 135° or 45°.

Thus, while there have been shown and described and pointed out fundamental novel features of the invention as applied to a preferred embodiment thereof, it will be understood that various omissions and substitutions and changer in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Substitutions of elements from one described embodiment to another are also fully intended and contemplated. It is also to be understood that the drawings are not necessarily drawn to scale but that they are merely conceptual in nature. It is the intention, therefore, to be limited only as indicated by the scope of the claims appended hereto.

What is claimed is:

1. A wire direction changer assembly for installation in a wire path system of a wire electrode spark erosion machine, the assembly comprising:

a) a wire entrance port;
   b) a wire discharge port;
   c) a substantially tube shaped wire guide channel connecting both ports along a curved path for forming a wire feed path having a wire feed direction extending from the wire entrance port to the wire discharge port along which a wire is fed; and
   d) a fluid supply means for providing fluid flow through the wire guide channel; and wherein the fluid supply means comprises a suction device disposed in the region of the wire discharge port.

2. The wire direction changer assembly according to claim 1, wherein the fluid supply means comprises a suction nozzle.

3. The wire direction changer assembly according to claim 2, wherein the suction nozzle is constructed as a dual-chamber nozzle having substantially two mutually concentric nozzle chambers, an inner mutually concentric nozzle chamber and an outer mutually concentric nozzle chamber, with the inner nozzle chamber running into a wire discharge port and the outer nozzle chamber adapted for connection to a pressurized fluid supply.

4. The wire direction changer assembly according to claim 3, wherein the inner nozzle chamber projects outwardly in the direction of the wire feed direction from the outer nozzle chamber.

5. The wire direction changer assembly according to claim 1, further comprising a) a guide block with the wire guide channel extending therethrough; and
   b) a return pulley rotatably supported in the guide block, with the periphery of the return pulley forming a curved wall section of the wire guide channel.

6. The wire direction changer assembly according to claim 5, wherein the periphery of the return pulley is designed as one of a V-shaped guide groove or a U-shaped guide groove.

7. The wire direction changer assembly according to claim 5, wherein the periphery of the return pulley has a smooth surface, driven by the fluid flow.

8. The wire direction changer assembly according to claim 5, wherein each of the wire guide channels comprises at its respective inlet side and discharge side substantially straight channel sections connected to each other through a curved channel section curved about a substantially right angle.

9. The wire direction changer assembly according to claim 8, wherein the periphery of the rotating return pulley forms a wall segment of the rectangularly curved channel section.

* * * * *

UNITED STATES PATENT AND TRADEMARK OFFICE
CERTIFICATE OF CORRECTION

PATENT NO. : 5,866,865
DATED : February 2, 1999
INVENTOR(S) : Luciano BEZZOLA et al.

It is certified that error appears in the above-identified patent and that said Letters Patent is hereby corrected as shown below:

On title page, [73], Assignee, please correct "LONSONE" to --LOSONE--.

Signed and Sealed this

Seventh Day of September, 1999

Attest:

Q. TODD DICKINSON

*Attesting Officer*     *Acting Commissioner of Patents and Trademarks*